United States Patent [19]

Yang

[11] Patent Number: 5,500,243
[45] Date of Patent: Mar. 19, 1996

[54] PROCESS FOR PLANARIZING SUBSTRATE SURFACES FOR MAGNETIC THIN FILM HEADS

[75] Inventor: Danny D. L. Yang, San Diego, Calif.

[73] Assignee: Eastman Kodak Company, Rochester, N.Y.

[21] Appl. No.: 410,588

[22] Filed: Mar. 27, 1995

Related U.S. Application Data

[63] Continuation of Ser. No. 125,086, Sep. 21, 1993, abandoned.

[51] Int. Cl.$^6$ ........................................... B05D 5/12
[52] U.S. Cl. ................ 427/126.3; 427/240; 427/241; 427/376.2; 427/377; 427/384
[58] Field of Search ........................... 427/126.3, 240, 427/241, 376.2, 377, 384

[56] References Cited

U.S. PATENT DOCUMENTS

| | | | |
|---|---|---|---|
| 4,459,327 | 7/1984 | Wang | 427/241 |
| 4,619,839 | 10/1986 | Lehrer | 427/240 |
| 4,676,867 | 6/1987 | Elkins et al. | 156/643 |
| 4,849,296 | 7/1989 | Haluska et al. | 427/240 |
| 5,202,152 | 4/1993 | Giannelis et al. | 427/240 |
| 5,256,443 | 10/1993 | Tomita | 427/240 |

*Primary Examiner*—Benjamin Utech

[57] ABSTRACT

A process for forming dielectric thin film coating suitable for use in magnetic thin film heads includes the application of a spin-on-glass material on a substrate, the spinning of the substrate, the preheating of the substrate and thin film to remove the solvents in the spin-on-glass material, and the heating in a reducing or in an inert atmosphere of the film to provide a conversion to a $SiO_2$ film. The reducing and the inert atmospheres permit carbon to be left in the film. The presence of the carbon improves structural properties of the thin films.

4 Claims, 1 Drawing Sheet

PROCESS FOR PLANARIZING SUBSTRATE SURFACES FOR MAGNETIC THIN FILM HEADS

This is a Continuation of application Ser. No. U.S. Pat. No. 125,086, filed 21 Sep. 1993, now abandoned.

FIELD OF INVENTION

This invention relates to the processes for the fabrication of thin films and, more particularly, to a process for providing amorphous dielectric coating which results in superior strength and the elimination of substrate surface defects.

BACKGROUND OF THE INVENTION

The spin-on process has been used to planarize and smooth-out pits on the substrate surface in the fabrication of inductive recording heads and magneto-resistive heads. In the past, the spin-on or amorphous procedure has resulted in the film eventually being converted to a near-stoichiometric $SiO_2$ at high temperatures (>500° C.). The conversion to near-stoichiometric $SiO_2$ is revealed by the refractive index value of 1.45–1.46 and confirmed by an ESCA analysis.

While the spin-on technique has provided satisfactory dielectric thin film coatings for a substrate surface, none-the-less, a need has been found for dielectric thin film coatings which not only planarize the surface, for example, of a magnetic head, but which have improved hardness and wear resistance parameters.

SUMMARY OF THE INVENTION

The present invention is directed to overcoming one or more of the problems set forth above. Briefly summarized, according to one aspect of the present invention, the typical spin-on procedure is implemented in which the thin film is exposed to either a reducing atmosphere or to a Nobel gas atmosphere during the conversion of the film to $SiO_2$. The use of the reducing and inert atmospheres increases the residual carbon remaining in the resulting film and improves the structural properties of the film.

The heating of the amorphous film in a reducing atmosphere during which a carbide phase is formed in the oxide matrix provides improved hardness and wear resistance properties.

These and other aspects, objects, features and advantages of the present invention will be more clearly understood and appreciated from a review of the following detailed description of the preferred embodiments and appended claims, and be reference to the accompanying drawings.

DESCRIPTION OF THE PREFERRED EMBODIMENTS

Figure 1:
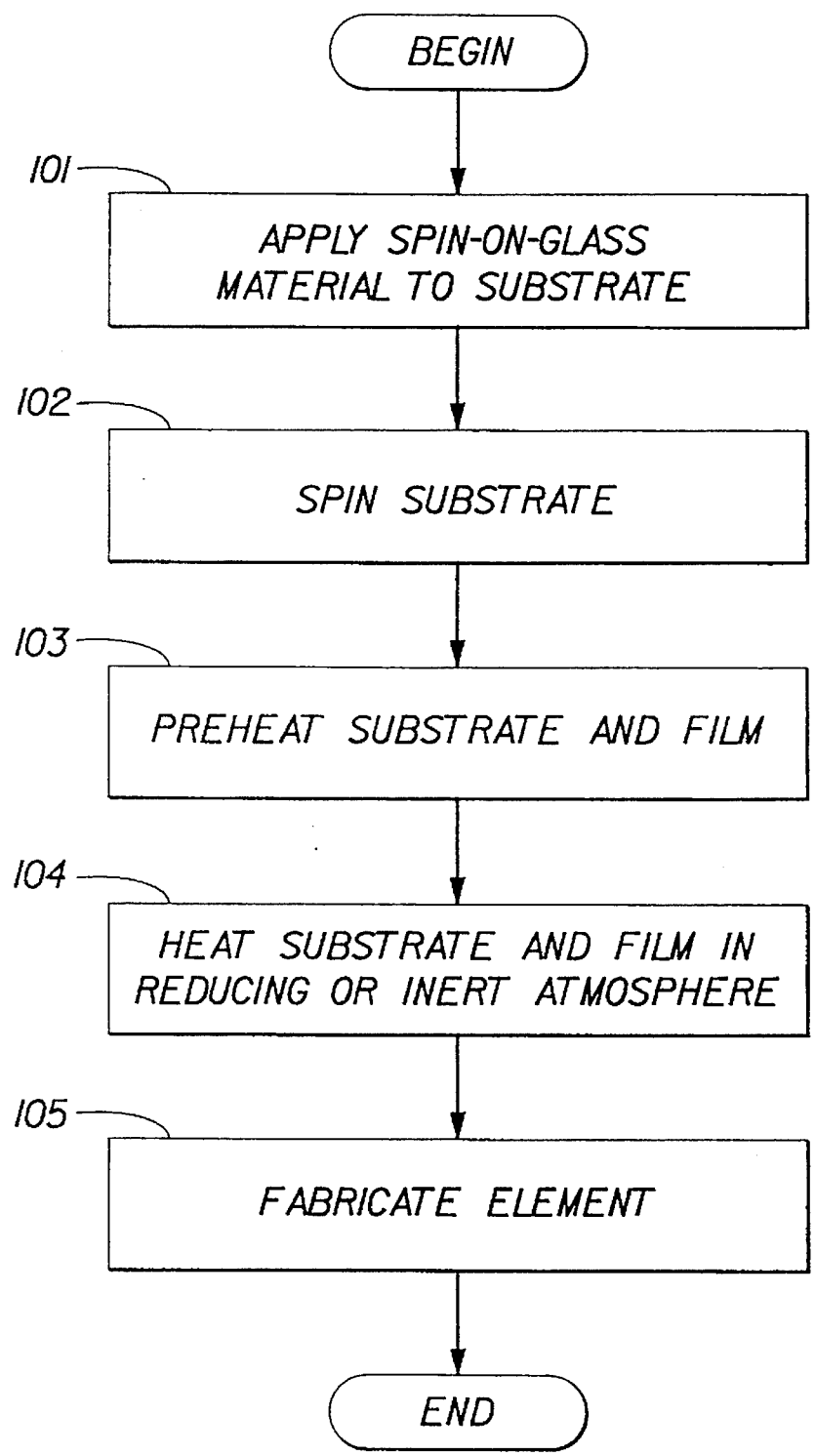
FIG. 1 provides a flow diagram of the spin-on process according to the present invention.

The spin-on coatings, in accordance with the present invention, are prepared as shown in FIG. 1. A spin-on solution is applied to a substrate in step 101. After application of the solution, the substrate is spun, in step 102 at a speed generally within the range from 500 to 7,000 rpm and depositing onto the center of the spinning substrate a suitable quantity of a spin-on solution. The materials generally employed for the amorphous coatings are silicon containing compounds including silanes, siloxanes, and silicon polymers which, upon thermal treatment, convert to silicon dioxide. Many suitable commercially prepared materials are available such as the solution provided by Allied Chemical Corporation of the Morristown, N.J. under the trade designation ACCUGLASS, Type 204; by Owens-Illinois Company of Toledo Ohio, under the trade designation GR650; by Futurrex, Inc. of Newton, N.J. under the designations of DC1-200 and DC4-500; and by Filmtronics, Inc. of Butler, Pa. under the trade designation SiN. Suitable silanes include tetramethoxy silane, and tetraethoxy silane. Suitable siloxanes containing a silicon-oxygen backbone are disclosed in U.S. Pat. No. 4,676,867. In addition to those spin-on materials set forth above, tetraethoxy can be employed as a spin-on-glass material either by itself or in combination with other materials including the silicon containing materials previously mentioned. The spin-on materials are generally solvent solutions of the particular silicon containing material, the solvent in many instances being ethanol. Other suitable solvents, such as methanol, propanol, butanol, methylethylketone, acetone and the like, can be used. The thickness of the spin-on layer is determined by the viscosity of the spin-on solution initially applied to the spinning substrate and the speed at which the substrate is spun. These variables must be chosen such that the resulting thickness of the spin-on layer is less than 1 micron, and, preferably, approximately 0.5 microns. After the spin-on application, the film of the substrate is preheated in step 103 at a suitable temperature depending on the composition of the spin-on solution. Typical temperatures range from about 120° C. to about 350° C., however temperatures in the range from 250° C. to 330° C. are recommended for some commercially available materials. The purpose of this preheat is to remove substantially all of the solvents by evaporation. Next, the film is subjected to higher temperatures, in step 104, in order to convert the coating to silicon dioxide when a silicon-containing solution is initially applied. Typically, the temperatures in the conversion process are in the range 900° C. to 1100° C. The heating is done in the presence of a reducing atmosphere. Under these conditions, a dense, high hardness is produced, the film containing a carbide component. The heating can be performed by an oven, infrared lights, a furnace, a hot plate, or a rapid thermal processor. The rapid thermal processor is available for such purposes and has the advantages of a rapid and controllable ramp up and cool down procedure, thermal uniformity through out the volume of the sample, environmental control, cleanliness, reproducibility, and safety. Furthermore, thermal gradients in the film, solvent diffusion, and film recystalization phenomenon can be reduced or totally eliminated with the rapid thermal processor. By way of specific example, the RZ 103 model rapid thermal processor distributed by AETADDEX is suitable for purposes of the present invention. The AETADDEX device is capable of curing spin-on coatings up to 1100° C. The substrate with the solid coating is preheated on a hot plate or oven to remove the solvent. The substrate together with the coating is ramped to 1100° C. from room temperature in one to three minutes. Vacuum pumping cycles before and after processing may be employed to assure the quality of gas environment and safety of operation. Processing gas flows at controlled rates during the processing period. Half micron thick coatings are readily and reproducibly achieved with no peeling or observable cracks. After the heating step is completed, the substrate along with the spin-on coating is fabricated, in step 105, into the appropriate element, e.g., into magnetic thin film heads. The heating step can be carried out in the heating chamber by first vacuuming the heating chamber and then producing a reducing atmosphere in the heating chamber by flowing hydrogen gas along with a second gas through the heating chamber.

Operation of the present invention is believed to be apparent from the foregoing description and drawings, but a few words will be added for emphasis. The phase of the spin-on-glass in film fabrication in which the material is heated to convert the spin-on solution to near stoichiometric $SiO_2$ at high temperatures (i.e., >500° C.). The conversion is indicated by the refractive index value of 1.45–1.46. and confirmed by ESCA analysis. However, when the process is performed in a reducing atmosphere, such as Nitrogen or Argon, a substantial amount of carbon is retained in the film and Si-C is formed at high temperatures ($\approx$900° C.–1100° C.). This Si-C formation is indicated by a discoloration of the amorphous film and the higher index of refraction ($\approx$1.57–1.75). ESCA analysis indicates that a 5%–149% in the carbon content of the film is found in a spin-on-glass film processed with a nitrogen atmosphere. The increase in the carbon content is directly related to the decrease in oxygen content of the film. Therefore, performing the heating portion of the spin-on process in a nitrogen atmosphere at high temperature results in a mechanically superior film as compared to a film prepared in an air/oxygen atmosphere. In addition, the total stress of the spinon film appeared to be less than the stress of films processed in an air/$O_2$ atmosphere.

The amorphous films processed in a Nobel gas atmosphere, such as argon, also contain increased amounts of carbon as compared to films prepared in an air/$O_2$ atmosphere, but with less carbon than the films prepared in a nitrogen atmosphere. In addition, when the original spin-on solution included boron, then boron was found in the resulting film.

The process of the present invention eliminates substrate surface pits which have a dimension less than 0.3 in size, a basic requirement for fabricating high yield magnetic recording heads.

While the invention has been described with reference to a reducing atmosphere, such as nitrogen, and a Nobel gas atmosphere, such as Argon, it will be clear that the invention is easily adapted to other atmospheres having similar properties such as an ammonia or a methane gas atmosphere.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention,

What is claimed is:

1. A process for forming a dielectric nonmetallic thin film coating on a substrate surface used in magnetic thin film heads, said process comprising the steps of:

applying a silicon solution which includes carbon and oxygen to the surface of a substrate;

spinning said substrate to form a uniform coating of said silicon solution on said surface of said substrate;

preheating said coating to a temperature whereby all solvents are released from said uniform coating;

following said preheating step, heating said coating in a temperature range of 900 degrees C. to 1100 degrees C. in a reducing or inert atmosphere to form an amorphous nonmetallic, dielectric coating of silicon dioxide and silicon carbide on said surface of said substrate, which is hard and wear resistant and which planarizes said surface of said substrate by eliminating substrate surface pits; and fabricating said substrate with said amorphous nonmetallic, dielectric coating of silicon dioxide and silicon carbide with a magnetic thin film head.

2. The process of claim 1 wherein said heating step is carried out in a heating chamber and includes the steps of;

first, vacuum pumping the heating chamber, and then producing said reducing atmosphere in said heating chamber by flowing hydrogen gas along with a second gas therethrough.

3. The process of claim 2 further comprising the step of selecting said second gas from the group consisting of Nitrogen and Argon.

4. The process of claim 1 wherein said heating step is carried out in a reducing atmosphere including nitrogen gas and wherein said coating has a carbon content of 5% to 9%.

* * * * *